US009204365B2

(12) United States Patent
Singh et al.

(10) Patent No.: US 9,204,365 B2
(45) Date of Patent: *Dec. 1, 2015

(54) CONTROLLING WHETHER A NETWORK ENTITY PERFORMS ACCESS CONTROL BASED ON AN INDICATION FROM AN ACCESS POINT

(75) Inventors: Damanjit Singh, San Diego, CA (US); Manoj M. Deshpande, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 12/696,308

(22) Filed: Jan. 29, 2010

(65) Prior Publication Data

US 2010/0199326 A1 Aug. 5, 2010

Related U.S. Application Data

(60) Provisional application No. 61/149,261, filed on Feb. 2, 2009.

(51) Int. Cl.
*G06F 7/04* (2006.01)
*H04W 48/02* (2009.01)
*H04W 12/08* (2009.01)
*H04W 84/04* (2009.01)

(52) U.S. Cl.
CPC .............. *H04W 48/02* (2013.01); *H04W 12/08* (2013.01); *H04W 84/045* (2013.01)

(58) Field of Classification Search
CPC .................................................. H04W 84/045
See application file for complete search history.

(56) References Cited

U.S. PATENT DOCUMENTS

| 6,628,937 | B1 | 9/2003 | Salin |
| 6,662,005 | B1 | 12/2003 | Palvianen |
| 7,197,034 | B2 | 3/2007 | Muhonen |
| 7,366,149 | B2 | 4/2008 | Maki et al. |
| 7,603,119 | B1 | 10/2009 | Durig et al. |

(Continued)

FOREIGN PATENT DOCUMENTS

| JP | 2005277804 A | 10/2005 |
| JP | 2006197046 A | 7/2006 |

(Continued)

OTHER PUBLICATIONS

Ericsson—change document, R3-082916, 3GPP TSG RAN WG3, 3GHNB Adhoc Meeting R3-082916 Vienna, Austria, Oct. 21-22, 2008, Retrieved from the Internet <URL: .3gpp.org/FTP/tsg_ran/WG3_lu/TSGR3_AHGs/RAN3_HNB_adhoc_October2008/docs/>, pp. 1-3 as printed.*

(Continued)

*Primary Examiner* — Michael Chao
(74) *Attorney, Agent, or Firm* — Ashish L. Patel

(57) ABSTRACT

An access point sends an indication or message to a network entity to indicate whether the network entity is to perform access control for an access terminal. In some implementations the indication/message may comprise an explicit indication of whether or not that network entity is to perform the access control. In some implementations, the inclusion of information (e.g., a CSG identifier) in the message or the exclusion of information from the message indicates whether the network entity is to perform the access control.

47 Claims, 10 Drawing Sheets

(56) References Cited

U.S. PATENT DOCUMENTS

| | | | |
|---|---|---|---|
| 2005/0044138 | A1 | 2/2005 | Albert et al. |
| 2005/0198319 | A1 | 9/2005 | Chan et al. |
| 2005/0239445 | A1 | 10/2005 | Karaoguz et al. |
| 2006/0171537 | A1 | 8/2006 | Enright |
| 2007/0054668 | A1 | 3/2007 | Scheinert et al. |
| 2007/0183427 | A1 | 8/2007 | Nylander et al. |
| 2008/0076412 | A1 | 3/2008 | Khetawat et al. |
| 2008/0132239 | A1 | 6/2008 | Khetawat et al. |
| 2008/0155658 | A1* | 6/2008 | Leinonen et al. ............ 726/4 |
| 2008/0267153 | A1 | 10/2008 | Mukherjee et al. |
| 2009/0042596 | A1 | 2/2009 | Yavuz et al. |
| 2009/0047931 | A1 | 2/2009 | Nanda et al. |
| 2009/0047960 | A1 | 2/2009 | Gunnarsson et al. |
| 2009/0070694 | A1 | 3/2009 | Ore et al. |
| 2009/0094351 | A1 | 4/2009 | Gupta et al. |
| 2010/0198968 | A1 | 8/2010 | Singh et al. |
| 2010/0238858 | A1 | 9/2010 | Kim et al. |
| 2010/0298017 | A1 | 11/2010 | Dalsgaard et al. |
| 2011/0177814 | A1* | 7/2011 | Buchmayer et al. ....... 455/435.1 |
| 2011/0218004 | A1 | 9/2011 | Catovic et al. |
| 2012/0094674 | A1 | 4/2012 | Wu |

FOREIGN PATENT DOCUMENTS

| | | |
|---|---|---|
| JP | 2012503898 A | 2/2012 |
| WO | WO2010036181 | 4/2010 |

OTHER PUBLICATIONS

Specification Revision, R3-082923, 3GPP TS 25.467 V0.0.0 (Sep. 2008), Retrieved from the Internet <URL: : .3gpp.org/FTP/tsg_ran/WG3_Iu/TSGR3_AHGs/RAN3_HNB_adhoc_October2008/docs/>, pp. 1-10 as printed.*

Meeting agenda, 3GPP TSG RAN WG3 3GHNB Adhoc Meeting with tdocs R3-082870 Vienna, Austria, Oct. 21-22, 2008, Retrieved from the Internet <URL: .3gpp.org/FTP/tsg_ran/WG3_Iu/TSGR3_AHGs/RAN3_HNB_adhoc_October2008/chairman%20notes/>, pp. 1-7 as printed.*

No stated author; ETSI TS 125 467 V11.5; Jan. 2014; Retrieved from the Internet <URL: etsi.org/deliver/etsi_ts/125400_125499/125467/11.05.00_60/ts_125467v110500p.pdf>; pp. 1-83 as printed.*

No stated author; ETSI TS 125 413 V8.1.0; Jan. 2009; Retrieved from the Internet <URL: etsi.org/deliver/etsi_ts/125400_125499/125413/08.01.00_60/ts_125413v080100p.pdf.pdf>; pp. 1-2 as printed.*

No stated author; ETSI TS 125 413 V9.2.0; Apr. 2010; Retrieved from the Internet <URL: www.etsi.org/deliver/etsi_ts/125400_125499/125413/09.02.00_60/ts_125413v090200p.pdf>; pp. 1-2 as printed.*

No stated author; R3-091868; Aug. 2009; Retrieved from the Internet <URL: 3gpp.org/ftp/tsg_ran/WG3_Iu/TSGR3_65/Docs/R3-091868.zip>; pp. 1-12 as printed.*

3GPP: "3rd Generation Partnership Project;Technical Specification Group Radio Access Network;Home (e)NodeB;Network aspects(Release 8)" 3GPP Draft; R3.020_V090_With Changes, 3rd Generation Partnership Project (3GPP), Mobile Competence Centre; 650, Route Des Lucioles; F-06921 Sophia-Antipolis Cedex; France. no. Jeju Island, South Korea; (Sep. 3, 2008), XP050323670.

3rd Generation Partnership Project; Technical Specification Group Radio Access Network; UTRAN Architecture for 3G Home NODEB; Stage 2 (Release 8) 3GPP Standard; 3GPP TS 25.467, 3rd Generation Partnership Project (3GPP), Mobile Competence Centre; 650, Route Des Lucioles; F-06921 Sophia-Antipolis Cedex; France, No. V8.0.0, (Dec. 1, 2008), pp. 1-22, XP050369091.

Ericcson:"Access Control of legacy and CSG UE in the same network" 3GPP Draft; R3-082907, 3rd Generation Partnership Project (3GPP), Mobile Competence Centre, 650, Route Des Lucioles, F-06921 Sophia-Antipolis Cedex, France, no. Vienna, Austria; (Oct. 17, 2008), XP050325473.

Femto Access Point service Data Model 3GPP Draft; WT_196_PREV100_REV06, 3rd Generation Partnership Project (3GPP), <PUBATTR/>, no. Sophia Antipolis, France; (Jan. 30, 2009), XP050335529.

Huawei, et al., "CSG access control for H(e)NB" 3GPP Draft; S2-090789_CSG Access Control for H(E)NB, 3RD Generation Partnership Project (3GPP), Moble Competence Centre, 650, Route Des Lucioles : F-06921 Sophia-Antipolis Cedex ; France, no. Phoenix; (Jan. 16, 2009), XP050333217.

International Search Report—PCT/US10/022933, International Search Authority—European Patent Office—May 3, 2010.

Nokia Siemens Networks, et al., "CSG Identifiers for HNB Access and Procedures" 3GPP Draft; R3-083370, 3rd Generation Partnership Project (3GPP), Mobile Competence Centre; 650, Route Des Lucioles; F-06921 Sophia-Antipolis Cedex; France, No. Prague, Czech Republic; (Nov. 7, 2008), XP050324586.

Qualcomm Europe: "Principles of Access Control for CSG Cells" 3GPP Draft; C1_083100, 3rd Generation Partnership Project (3GPP), Mobile Competence Centre ; 650, Route Des Lucioles ; F-06921 Sophia-Antipolis Cedex; France, no. Budapest, Hungary; (Aug. 11, 2008), XP050308778.

Written Opinion—PCT/US10/022933, International Search Authority—European Patent Office—May 3, 2010.

ZTE: "HNB Access Mode Handling Procedure" 3GPP Draft; R3-090254 HNB Access Mode Handling, 3rd Generation Partnership Project (3GPP), Mobile Competence Centre; 650, Route Des Lucioles; F-06921 Sophia-Antipolis Cedex; France, No. Athens, Greece, (Feb. 4, 2009), XP050325025.

ZTE: "HNB/HENB Access Control" 3GPP Draft; S2-090733_S2_70_HENB Access Control_REV From 0678, 3rd Generation Partnership Project (3GPP), Mobile Competence Centre; 650, Route Des Lucioles; F-06921 Sophia-Antipolis Cedex; France, No. Phoenix; (Jan. 16, 2009), XP050333171.

Ericsson: "Idle state access restriction for CSGs" 3GPP Draft; R2-074082, 3rd Generation Partnership Project (3GPP), Mobile Competence Centre , 650, Route Des Lucioles , F-06921 Sophia-Antipolis Cedex, France, vol. RAN WG2, no. Shanghai, China; (Oct. 1, 2007), XP050136712.

"Universal Mobile Telecommunications System (UMTS); Technical Specification Group Radio Access Network (UTRAN); UTRAN Architecture for 3G HNB (3GPP TS 25.467 version 8.0.0 Release 8)," ETSI TS 125 467 V8.0.0 (Jan. 2009), All pages.

Taiwan Search Report—TW099103049—TIPO—Mar. 21, 2013.

Qualcomm Europe: "Samsung CSG Access Control for H(e)NB, 3GPP, TD S2-090204", 3GPP TSG SA WG2 Meeting #70, TD S2-090204.

3rd Generation Partnership Project; Technical Specification Group Radio Access Network; UTRAN Architecture for 3G Home NODEB; Stage 2 (Release 8) 3GPP Standard; 3GPP TS 25.467, 3rd Generation Partnership Project (3GPP), Mobile Competence Centre; 650, Route Des Lucioles; F-06921 Sophia-Antipolis Cedex; France, (Nov. 30, 2008), pp. 1-11.

ETSI TS 125 469, "Universal Mobile Telecommunications System (UMTS); Technical Specification Group Radio Access Network (UTRAN); UTRAN Iuh Interface HNBAP signaling (3GPP TS 25.469 version 8.0.0 Release 8)", Jan. 2009, pp. 1-57.

Qualcomm Europe, "CSG based access control at core network", 3GPP TSG RAN WG3 meeting #63, R3-090191, Athens, Greece, Feb. 9-13, 2009, 1 Page.

* cited by examiner

CONTROLLING WHETHER A NETWORK ENTITY PERFORMS ACCESS CONTROL BASED ON AN INDICATION FROM AN ACCESS POINT

CLAIM OF PRIORITY

This application claims the benefit of and priority to commonly owned U.S. Provisional Patent Application No. 61/149,261, filed Feb. 2, 2009, the disclosure of which is hereby incorporated by reference herein.

CROSS-REFERENCE TO RELATED APPLICATION

This application is related to concurrently filed and commonly owned U.S. patent application Ser. No. 12/696,313, entitled "INCLUSION/EXCLUSION MESSAGING SCHEME FOR INDICATING WHETHER A NETWORK ENTITY PERFORMS ACCESS CONTROL,", the disclosure of which is hereby incorporated by reference herein.

BACKGROUND

1. Field

This application relates generally to wireless communication and more specifically, but not exclusively, to access control techniques.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to mobile units. Such small-coverage access points may be referred to as, for example, Home NodeBs (HNBs), Home eNodeBs (HeNBs), femto access points, femto cells, or access point base stations. Typically, such small-coverage base stations are connected to the Internet and the mobile operator's network via a DSL router or a cable modem.

In some implementations, a small-coverage access point may be configured to have restricted access (e.g., comprise closed subscriber group (CSG) cells). For example, access to the access point may be limited to those access terminals that have been designated by the owner or user of the access point. Accordingly, when an access terminal enters the coverage of such an access point, a mechanism must be provided for controlling access to that access point.

SUMMARY

A summary of sample aspects of the disclosure follows. In the discussion herein, any reference to the term aspects may refer to one or more aspects of the disclosure.

The disclosure relates in some aspects to controlling whether access control for an access terminal is to be performed by a network entity. Such a scheme may be employed, for example, in an implementation where access control for different access terminals may be performed by different network entities.

The disclosure relates in some aspects to a scheme where an access point sends an indication or a message to a network entity to inform the network entity whether that network entity is to control access for an access terminal. In some implementations, the indication/message may comprise an explicit indication of whether or not that network entity is to perform the access control. In some implementations, the inclusion of information (e.g., a CSG identifier) in the message or the exclusion of the information from the message indicates whether that network entity is to perform the access control.

BRIEF DESCRIPTION OF THE DRAWINGS

These and other sample aspects of the disclosure will be described in the detailed description and the appended claims that follow, and in the accompanying drawings, wherein:

Figure 1:
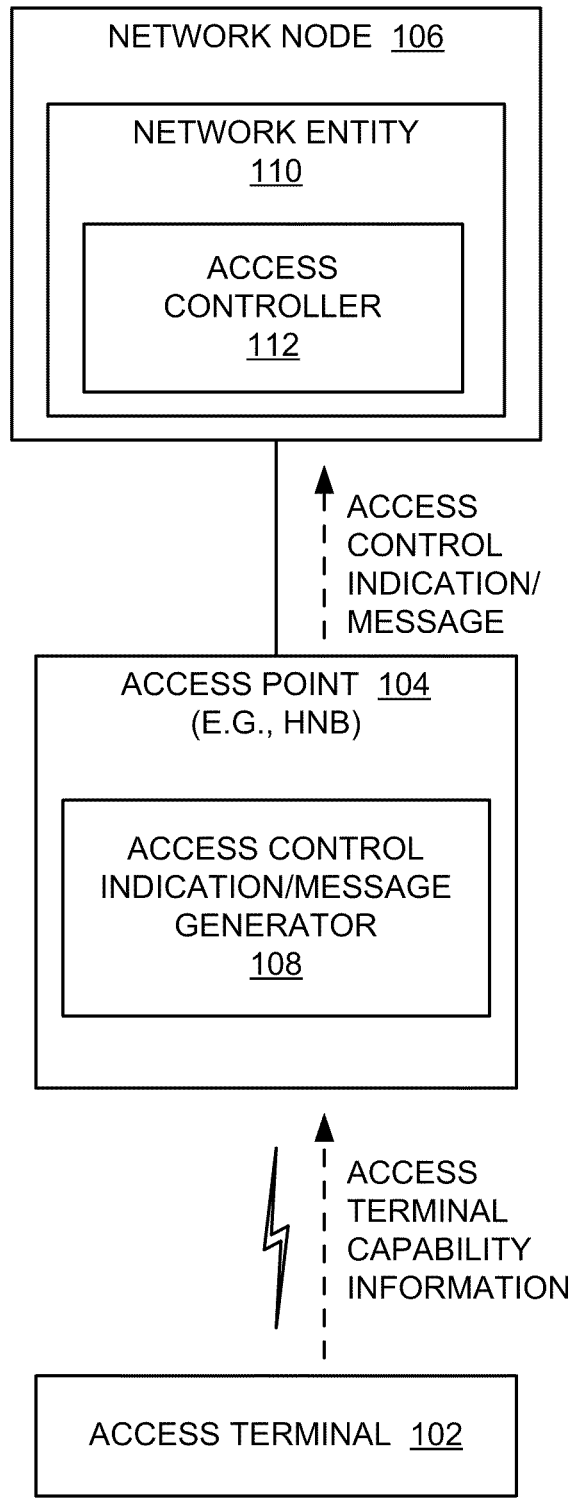
FIG. 1 is a simplified block diagram of several sample aspects of a communication system where an access point sends an indication/message to inform a network entity whether the network entity is to control access for an access terminal.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, NodeBs, HNBs, cells, and so on, while access terminals may be referred to or implemented as user equipment or mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some other access point (not shown in FIG. 1). Each of the access points may communicate with one or more network nodes (represented, for convenience, by network node 106) to facilitate wide area network connectivity. The network node 106 may take various forms such as, for example, one or more radio and/or core network entities. Thus, in various implementations the network node 106 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for the access terminals; and providing access control for access terminals. Also, two of more of these network entities may be co-located or distributed within the network.

In accordance with the teachings herein, the access point 104 includes access control indication/message generator functionality 108 for indicating whether a network entity 110 (e.g., implemented within or comprising the network node 106) is to perform access control for the access terminal 102. This access control may be based on a CSG concept or some other suitable access control concept. In some aspects, the access point 104 may determine whether the network entity 110 is to perform the access control based on access terminal capability information the access point 104 receives from the access terminal 102. For example, this information may indicate whether the access terminal 102 supports CSG functionality. Upon determining whether the network entity 110 is to perform the access control, the access point 104 sends a corresponding access control indication or message to the network entity 110. As discussed in detail below, this indication/message may comprise an indication (e.g., an explicit indication) of whether the network entity 110 is to perform access control or may indicate whether the network entity 110 is to perform access control based on the inclusion/exclusion of information in/from the message. Upon receiving this indication/message, access controller functionality 112 of the network entity 110 determines whether to perform access control for the access terminal 102.

The components of FIG. 1 may take different forms in different implementations. For example, the access point may comprise a HNB, a HeNB, a CSG cell, or other access point functionality with some form of restricted access. Also, the network entity may comprises an access point gateway (e.g., a HNB gateway or a HeNB gateway), a mobility management entity (MME), a mobile switching center/visitor location register (MSC/VLR), a serving GPRS support node (SGSN), or some other suitable entity.

With the above overview in mind, various techniques that may be employed to provide access control in accordance with the teachings herein will now be described in more detail with reference to FIGS. 2 and 3. Briefly, the flowchart of FIG. 2 describes sample operations that may be performed in conjunction with providing an indication, while the flowchart of FIG. 3 describes sample operations that may be performed in conjunction with including/excluding information in/from a message.

Figure 2:
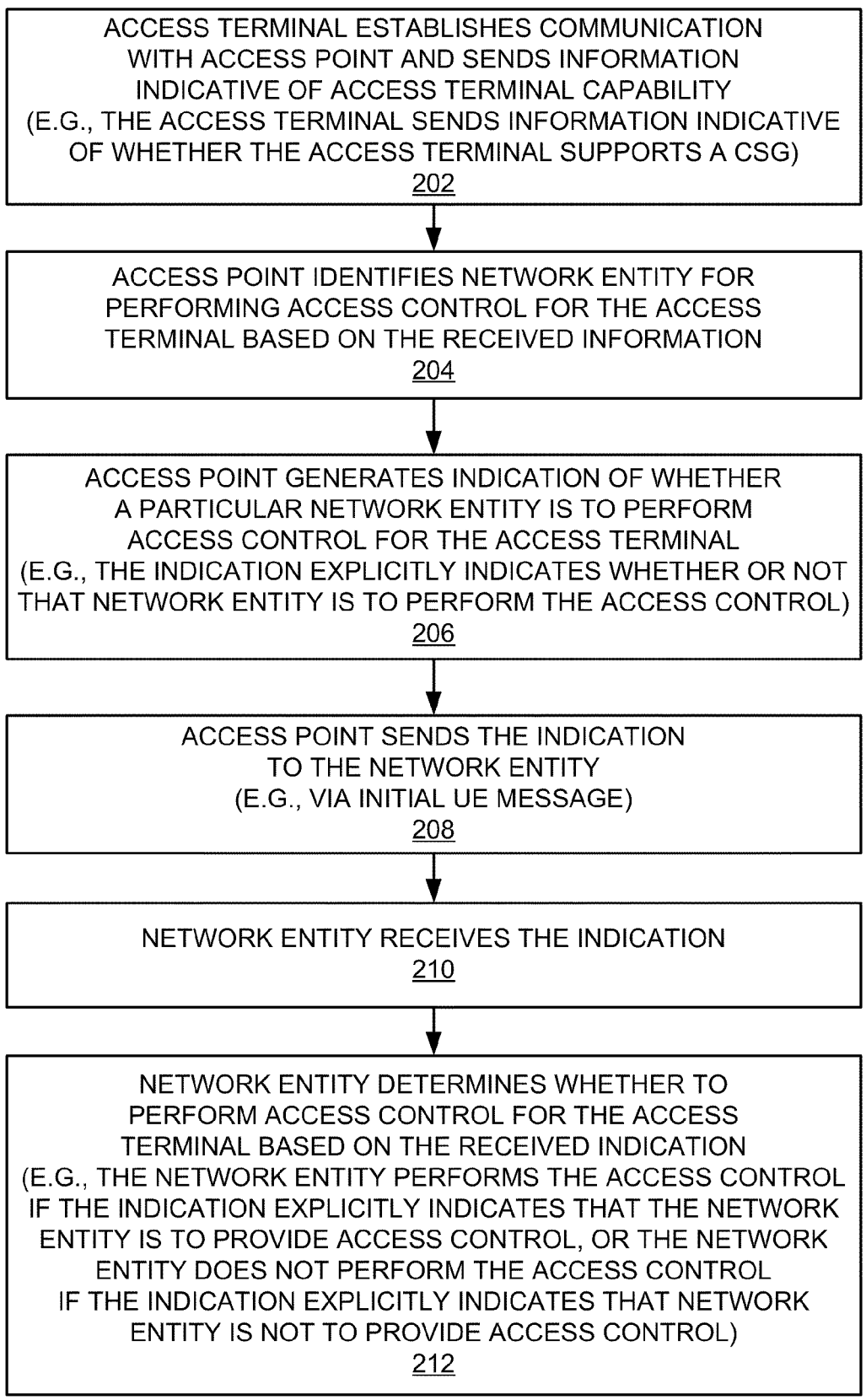
FIG. 2 is a flowchart of several sample aspects of operations that may be performed in conjunction with an access point sending an indication to a network entity to indicate whether the network entity is to control access for an access terminal.
Figure 3:
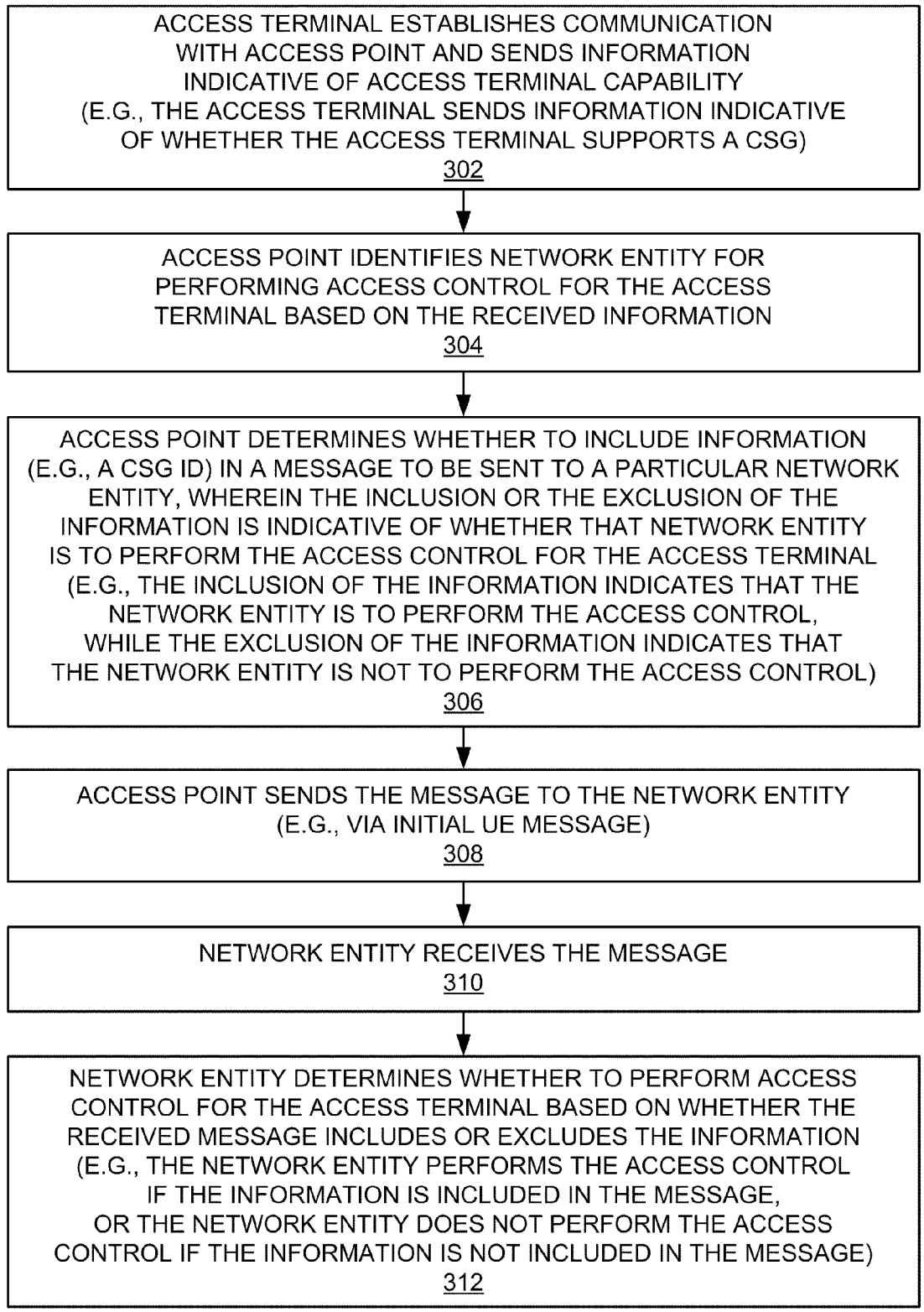
FIG. 3 is a flowchart of several sample aspects of operations that may be performed in conjunction with an access point sending a message to a network entity, wherein the inclusion of information in or the exclusion of information from the message indicates whether the network entity is to control access for an access terminal.
Figure 4:
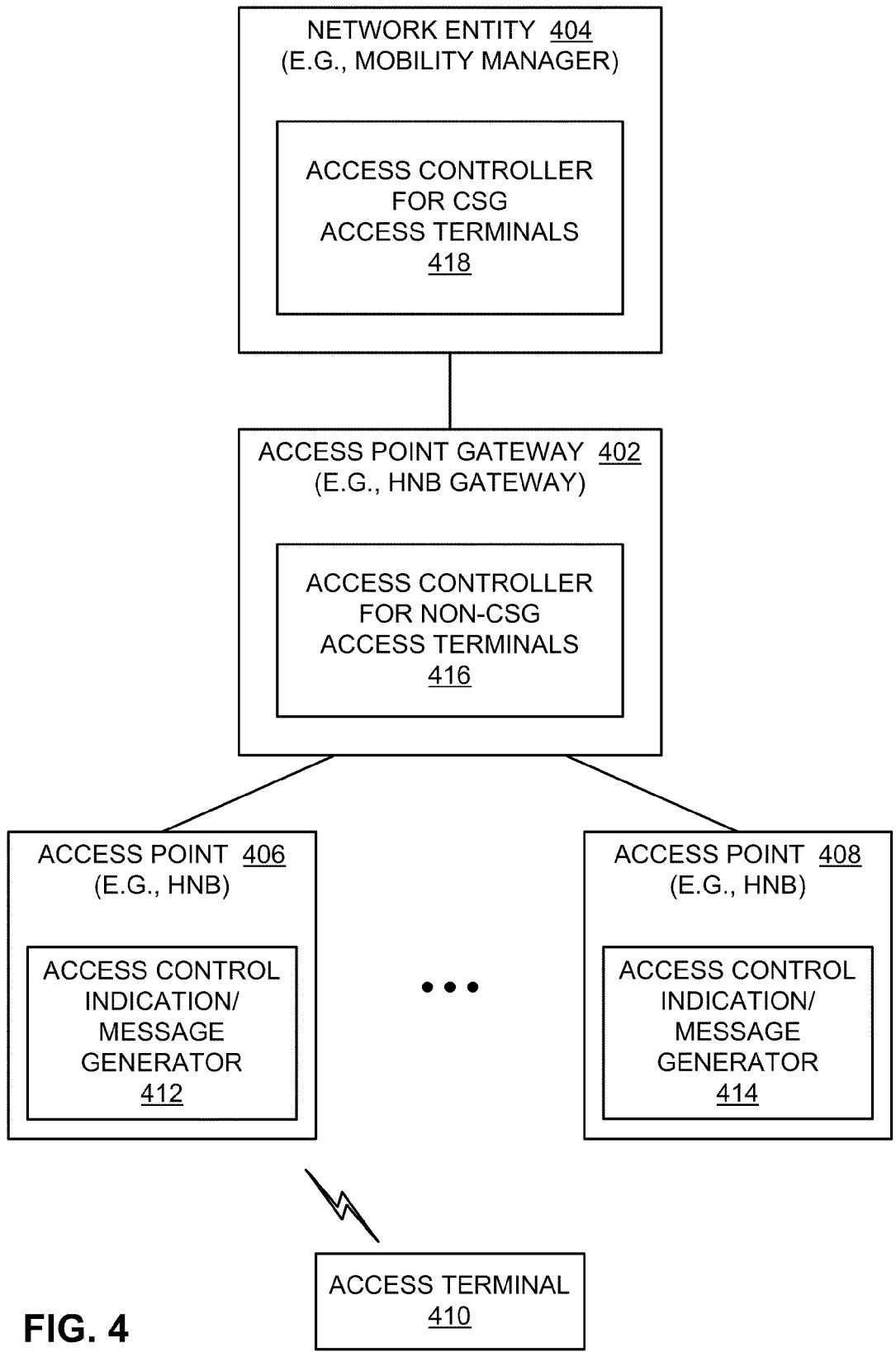
FIG. 4 is a simplified block diagram of several sample aspects of a communication system where either an access point gateway or another network entity controls access for an access terminal.
Figure 5:
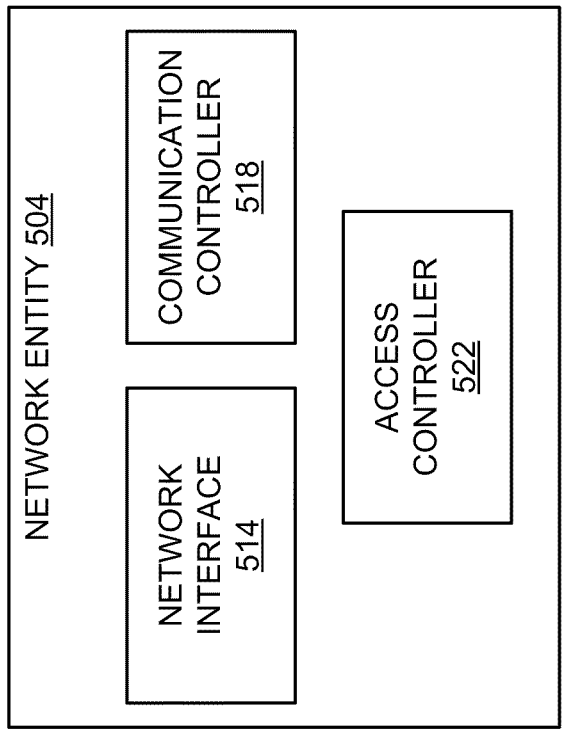
FIG. 5 is a simplified block diagram of several sample aspects of components that may be employed in communication nodes.
Figure 5:
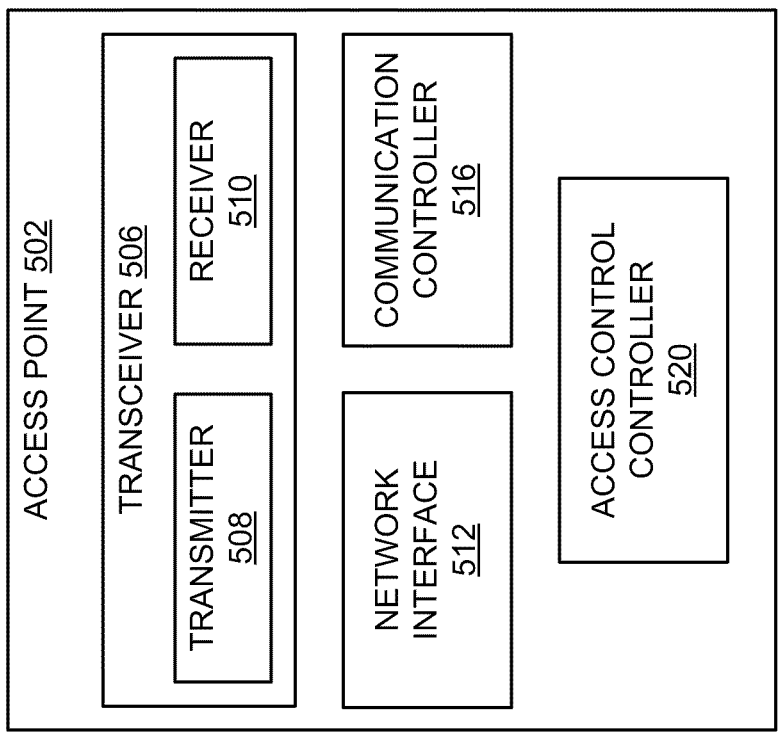

For illustration purposes, the operations of FIGS. 2 and 3 (or any other operations discussed or taught herein) may be described as being performed by specific components (e.g., the components shown in FIGS. 1, 4, and 5). It should be appreciated, however, that these operations may be performed by other types of components and may be performed using a different number of components. It also should be appreciated that one or more of the operations described herein may not be employed in a given implementation.

As represented by block 202 of FIG. 2, at some point in time, an access terminal establishes communication with an access point with restricted access (e.g., the access point is a HNB associated with a CSG). For example, in a UMTS or LTE system, the access terminal may send an access stratum (AS) message such as an RRC message to the access point.

In conjunction with this message, the access terminal may send information that is indicative of the access terminal's capabilities. For example, an RRC message may comprise information that is indicative of whether the access terminal supports CSG functionality. In some implementations, this information comprises access terminal release information (e.g., access stratum release information). For example, the release information may identify which release(s) of a communication standard the access terminal supports. The release information, in turn, may indicate whether the access terminal supports CSGs (e.g., pre-release 8 in UMTS indicates that the access terminal does not support CSG functionality).

As represented by block 204, based on the received information, the access point identifies a network entity for performing access control for the access terminal. For example, one network entity may be designated for performing access control for access terminals that do not support CSG functionality and another network entity may be designated for performing access control for access terminals that do support CSG functionality. In such a case, the access point may determine which of these network entities should provide access control for the access terminal based on information received from the access terminal that indicates whether the access terminal supports CSG functionality.

As represented by block 206, the access point generates an indication that is indicative of whether a particular network entity is to perform access control for the access terminal. In this example, the generation of the indication is based on the determination made at block 204 (e.g., based on the information received from the access terminal).

The indication generated at block 206 may take various forms. In some implementations, this indication may implicitly indicate whether a network entity is to perform access control. In some implementations, this indication may explicitly indicate whether a network entity is to perform access control. For example, the indication may inform the network entity to perform access control on the access terminal or the indication may inform the network entity to not perform access control on the access terminal.

As represented by block 208, the access point sends the indication to the network entity. In some implementations, the indication may be sent in the form of an information element in a message. This information element may take various forms such as, for example, an enumerated value type, a Boolean data type, or some other data type. Moreover, a message sent by the access point may take various forms. For example, in a UMTS or LTE system, the access point may send the indication via an Initial UE message. It should be appreciated, however, that the message sent by the access point may or may not be related to access control.

The network entity receives the indication as represented by block 210. Then, as represented by block 212, the network entity determines whether to perform access control for the access terminal based on the received indication. For example, the network entity performs the access control if the indication indicates (e.g., implicitly or explicitly) that the network entity is to perform the access control. Conversely, the network entity does not perform the access control if the indication indicates (e.g., implicitly or explicitly) that the network entity is not to perform the access control.

Referring now to FIG. 3, as represented by block 302, an access terminal establishes communication with an access point with restricted access and sends information that is indicative of the access terminal's capabilities. These operations may thus correspond to the operations described above at block 202.

As represented by block 304, based on the received information, the access point identifies a network entity for performing access control for the access terminal. These operations may thus correspond to the operations described above at block 204.

As represented by block 306, the access point determines whether to include information in a message to be sent to a particular network entity, wherein the inclusion of the information in the message or the exclusion of the information from the message is indicative of whether that network entity is to perform access control for the access terminal. In this example, the inclusion/exclusion determination is based on the determination made at block 304 (e.g., based on the information received from the access terminal).

The information to be included/excluded at block 306 may take various forms. In some implementations, the access point may include/exclude its CSG ID in/from the message to indicate whether the network entity is to perform access control. For example, inclusion of the CSG ID in the message may indicate that the network entity is to perform the access control, while exclusion of the CSG ID from the message may indicate that the network entity is not to perform the access control.

In some aspects, the inclusion/exclusion of the information may indicate a capability of the access terminal. For example, the inclusion of information (e.g., the CSG ID) in the message may indicate that the access terminal supports CSG functionality, while the exclusion of information (e.g., the CSG ID) from the message may indicate that the access terminal does not support CSG functionality.

As represented by block 308, the access point sends the message to the network entity. In some implementations, the information may take the form of an information element in the message. Such a message may take various forms. For example, in a UMTS or LTE system, the message may comprise an Initial UE message. It should be appreciated, however, that the message sent by the access point may or may not be related to access control.

The network entity receives the message as represented by block 310. Then, as represented by block 312, the network entity determines whether to perform access control for the access terminal based on the received message. For example, the network entity may perform the access control if the message includes the information. Conversely, the network entity may not perform the access control if the message does not include the information.

Referring now to FIG. 4, for purposes of further explanation, another example of how access control may be performed in accordance with the teachings herein will be described in the context a UMTS or LTE system 400 where different network entities provide access control for different types of access terminals. For example, a network entity such as an access point gateway 402 (e.g., a HNB gateway, a HeNB gateway, etc.) may perform access control for access terminals that do not support CSG functionality. These access terminals may be referred to herein as non-CSG access terminals. Conversely, a core network entity 404 such as a mobility manager (e.g., an MME, a MSC/VLR, an SGSN, etc.) may perform access control for access terminals that do support CSG functionality. These access terminals may be referred to herein as CSG access terminals.

The access point gateway 402, the network entity 404, and access points 406 and 408 (e.g., HNBs, HeNBs, CSG cells, etc.) in the system 400 include functionality for controlling which network entity performs access control for an access terminal 410. For example, the access points 406 and 408 include access control indication/message generator functionality 412 and 414, respectively, for determining whether the access point gateway 402 or the network entity 404 is to perform access control for the access terminal 410. In addition, the access point gateway 402 includes access controller functionality 416 for controlling access for non-CSG access terminals, while the network entity 404 includes access controller functionality 418 for controlling access for CSG access terminals.

Sample operations that may be performed by the system 400 to provide access control for non-CSG access terminals and CSG access terminal will now be described. The case where the access terminal 410 represents a non-CSG access terminal (e.g., a pre-Release 8 UMTS access terminal) will be treated first, followed by treatment of the case where the access terminal 410 represents a CSG access terminal (e.g., a Release 8 or later UMTS access terminal).

When a non-CSG access terminal 410 initiates communication with the access point 406 (e.g., during an RRC connection setup), the access terminal 410 sends a message (e.g., an RRC Connection Setup Complete message) that indicates that the access terminal 410 does not support CSG functionality.

Upon receiving this indication, the access point 406 determines that the access point gateway 402 is to perform access control for the access terminal 410. The access point 406 sends a message to the access point gateway 402 that indicates that the access point gateway 402 is to perform the access control. For example, the message may comprise an indication or include/exclude information as discussed herein. In some implementations, the message may take the form of a registration request (e.g., a UE Register Request message) that includes an indication of the capabilities of the access terminal 410.

Upon receiving this message, the access point gateway 402 determines whether the access terminal 410 is allowed to access the access point 406 and sends a corresponding response message back to the access point 406. For example, the access point gateway 402 may indicate that access is allowed by accepting the registration of the access terminal 410.

If access is allowed, the access point 406 sends a message (e.g., a RANAP Initial UE message) to the network entity 404 to commence establishing connectivity for the access terminal 410 with the network. Here, the access point 406 may send the message to the access point gateway 402, which then forwards the message to the network entity 404. As discussed herein, the message (e.g., the Initial UE message) may indicate that the network entity 404 is not to perform access control for the access terminal 410. For example, the message may comprise an indication or exclude information (e.g., the CSG ID of the access point 406) as discussed herein. Thus, the network entity 404 may commence establishing connectivity for the access terminal 410 without determining whether access terminal 410 is allowed to access the access point 406.

Referring now to the case where the access terminal 410 represents a CSG access terminal, when the access terminal 410 initiates communication with the access point 406, the access terminal 410 sends a message (e.g., an RRC Connection Setup Complete message) that indicates that the access terminal 410 supports CSG functionality.

Upon receiving this indication, the access point 406 determines that the network entity 404 is to perform access control (e.g., CSG-based access control) for the access terminal 410. In some cases, the access point 406 may send a message to the access point gateway 402 that indicates that the access terminal 410 is attempting access. For example, the access point 406 may send a registration request (e.g., a UE Register Request message) to the access point gateway. In this case, the message may indicate that the network entity 404 is not to perform access control for the access terminal 410. For example, the message may comprise an indication or include/exclude information as discussed herein.

Upon receiving this message, the access point gateway 402 performs any requested actions. For example, the access point gateway 402 may send a response to the access point 406 indicating whether the registration of the access terminal 410 is accepted.

If the registration is accepted, the access point 406 sends a message (e.g., a RANAP Initial UE message) to the network entity 404 that indicates that the network entity 404 is to perform the access control for the access terminal 410. For example, the message may comprise an indication or include information (e.g., the CSG ID of the access point 406) as discussed herein. Again, the access point 406 may send the message to the access point gateway 402, which then forwards the message to the network entity 404.

Upon receiving this message, the network entity 404 determines whether the access terminal 410 is allowed to access the access point 406 and sends a corresponding response message back to the access point 406. The network entity 404 may then commence establishing connectivity for the access terminal 410.

FIG. 5 illustrates several sample components that may be incorporated into nodes such as an access point 502 (e.g., corresponding to the access point 104 or the access point 406) and a network entity 504 (e.g., corresponding to the network entity 110, the network entity 404, or the access point gateway 402) to perform access control operations as taught herein. The described components also may be incorporated into other nodes in a communication system. For example, other nodes in a system may include components similar to those described for the access point 502 and the network entity 504 to provide similar functionality. A given node may contain one or more of the described components. For example, an access point may contain multiple transceiver components that enable the access terminal to operate on multiple frequencies and/or communicate via different technologies.

As shown in FIG. 5, the access point 502 includes a transceiver 506 for communicating with other nodes. The transceiver 506 includes a transmitter 508 for sending signals (e.g., indications and messages) and a receiver 510 for receiving signals.

In some implementations, the access point 502 and the network entity 504 may include network interfaces 512 and 514, respectively, for communicating with one another and with other network nodes. For example, the network interfaces 512 and 514 may be configured to communicate with one or more network nodes via a wired or wireless backhaul.

The access point 502 and the network entity 504 also include other components to perform access control-related operations as taught herein. For example, the access point 502 and the network entity 504 may include communication controllers 516 and 518, respectively, for managing communication with other nodes (e.g., sending and receiving messages and indications) and for providing other related functionality as taught herein. In cases where entities are be co-located, the communication controller may, for example, provide functionality to facilitate inter-process communication between the entities (e.g., by passing data from one process to another). The access point 502 also includes an access control controller 520 (e.g., corresponding to indication/message generators 108 and 412) for controlling which network entity performs access control (e.g., generating an indication of whether a network entity is to perform access control and/or determining whether to include information in a message to indicate whether a network entity is to perform access control) and for providing other related functionality as taught herein. The network entity 504 also includes an access controller 522 (e.g., corresponding to controllers 112, 416 and 418) for controlling access for an access terminal (e.g., determining whether to perform access control based on a received indication and/or based on whether a received message includes or excludes information) and for providing other related functionality as taught herein.

For convenience the access point 502 and the network entity 504 are shown in FIG. 5 as including components that may be used in the various examples described herein. In practice, one or more of the illustrated components may provide different functionality in different implementations. As an example, in some implementations the access control controller 520 may generate an indication as taught herein and in some implementations the access control controller 520 may include/exclude information in/from a message as taught herein.

Also, in some implementations the components of FIG. 5 may be implemented in one or more processors (e.g., that uses and/or incorporates data memory for storing information or code used by the processor(s) to provide this functionality). For example, the functionality of blocks 512, 516, and 520 may be implemented by a processor or processors of an access point and data memory of the access point (e.g., by execution of appropriate code and/or by appropriate configuration of processor components). Similarly, the functionality of blocks 514, 518, and 522 may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In some aspects, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 6:
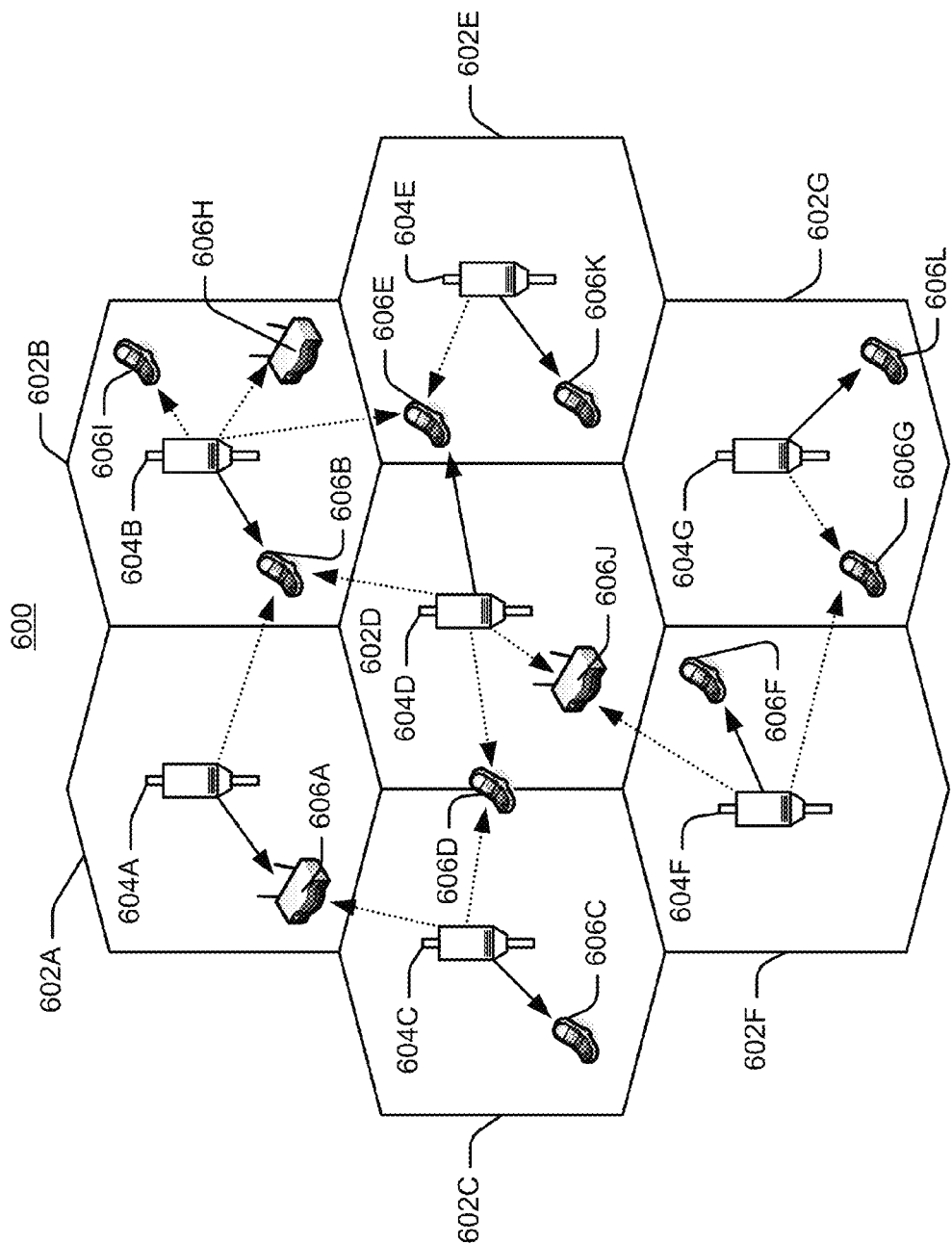
FIG. 6 is a simplified diagram of a wireless communication system.

FIG. 6 illustrates a wireless communication system 600, configured to support a number of users, in which the teachings herein may be implemented. The system 600 provides communication for multiple cells 602, such as, for example, macro cells 602A-602G, with each cell being serviced by a corresponding access point 604 (e.g., access points 604A-604G). As shown in FIG. 6, access terminals 606 (e.g., access terminals 606A-606L) may be dispersed at various locations throughout the system over time. Each access terminal 606 may communicate with one or more access points 604 on a forward link (FL) and/or a reverse link (RL) at a given moment, depending upon whether the access terminal 606 is active and whether it is in soft handoff, for example. The wireless communication system 600 may provide service over a large geographic region. For example, macro cells 602A-602G may cover a few blocks in a neighborhood or several miles in rural environment.

Figure 7:
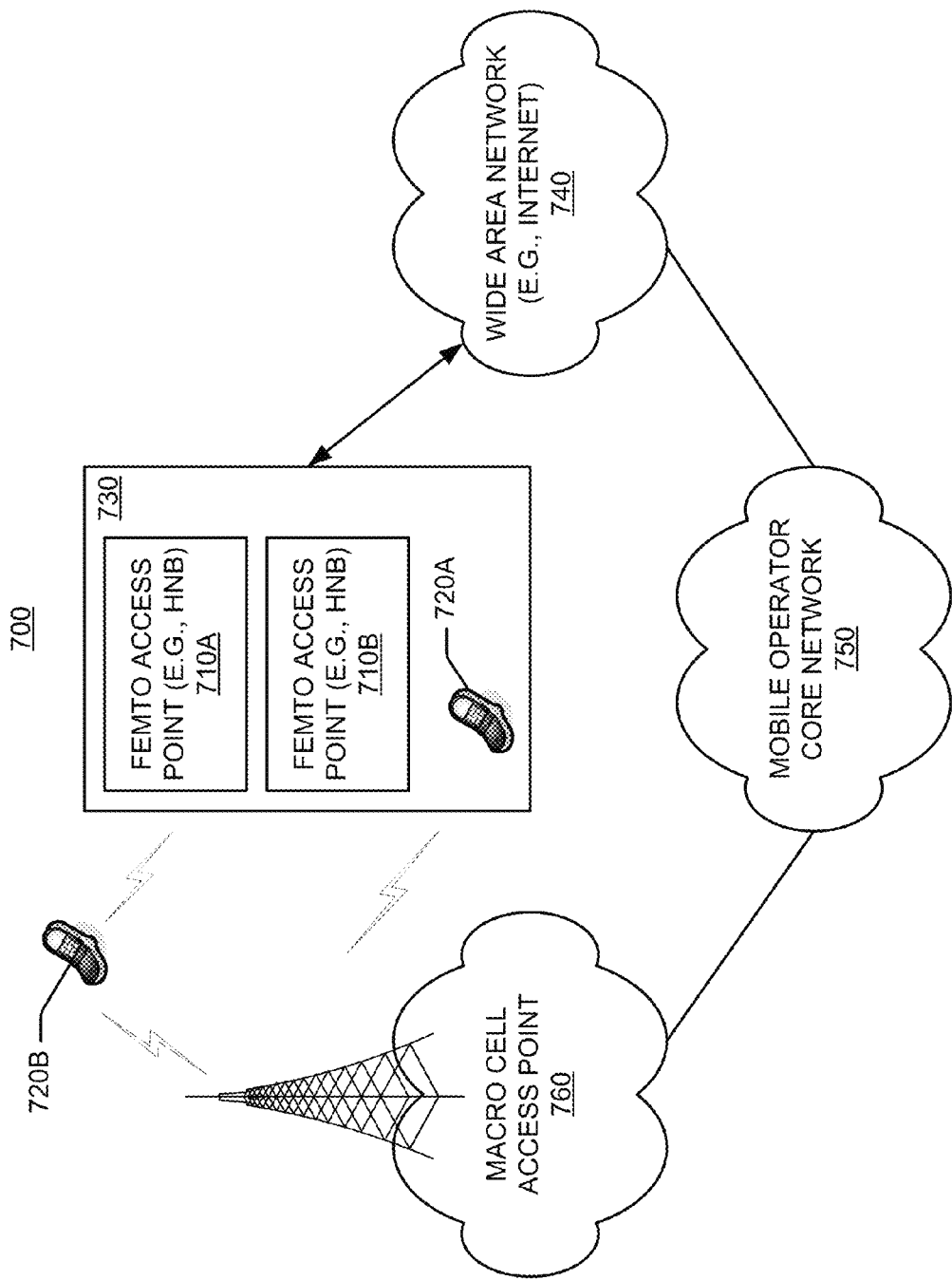
FIG. 7 is a simplified diagram of a wireless communication system including femto nodes.

FIG. 7 illustrates an exemplary communication system 700 where one or more femto access points are deployed within a network environment. Specifically, the system 700 includes multiple femto access points 710 (e.g., femto access points 710A and 710B) installed in a relatively small scale network environment (e.g., in one or more user residences 730). Each femto access point 710 may be coupled to a wide area network 740 (e.g., the Internet) and a mobile operator core network 750 via a DSL router, a cable modem, a wireless link, or other connectivity means (not shown). As will be discussed below, each femto access point 710 may be configured to serve associated access terminals 720 (e.g., access terminal 720A) and, optionally, other (e.g., hybrid or alien) access terminals 720 (e.g., access terminal 720B). In other words, access to femto access points 710 may be restricted whereby a given access terminal 720 may be served by a set of designated (e.g., home) femto access point(s) 710 but may not be served by any non-designated femto access points 710 (e.g., a neighbor's femto access point 710).

Figure 8:
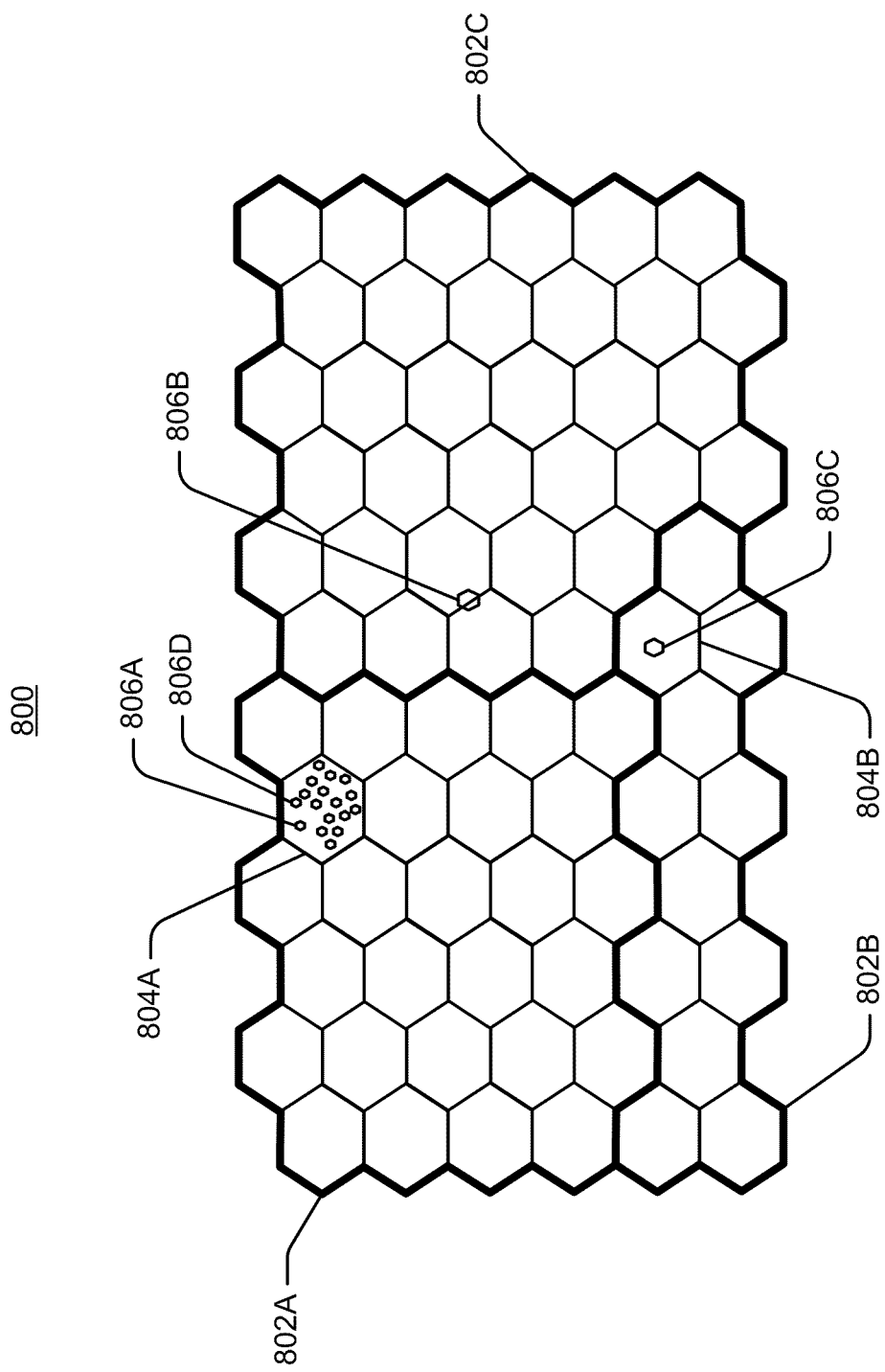
FIG. 8 is a simplified diagram illustrating coverage areas for wireless communication.

FIG. 8 illustrates an example of a coverage map 800 where several tracking areas 802 (or routing areas or location areas) are defined, each of which includes several macro coverage areas 804. Here, areas of coverage associated with tracking areas 802A, 802B, and 802C are delineated by the wide lines and the macro coverage areas 804 are represented by the larger hexagons. The tracking areas 802 also include femto coverage areas 806. In this example, each of the femto coverage areas 806 (e.g., femto coverage areas 806B and 806C) is depicted within one or more macro coverage areas 804 (e.g., macro coverage areas 804A and 804B). It should be appreciated, however, that some or all of a femto coverage area 806 may not lie within a macro coverage area 804. In practice, a large number of femto coverage areas 806 (e.g., femto coverage areas 806A and 806D) may be defined within a given tracking area 802 or macro coverage area 804. Also, one or more pico coverage areas (not shown) may be defined within a given tracking area 802 or macro coverage area 804.

Referring again to FIG. 7, the owner of a femto access point 710 may subscribe to mobile service, such as, for example, 3G mobile service, offered through the mobile operator core network 750. In addition, an access terminal 720 may be capable of operating both in macro environments and in smaller scale (e.g., residential) network environments. In other words, depending on the current location of the access terminal 720, the access terminal 720 may be served by a macro cell access point 760 associated with the mobile operator core network 750 or by any one of a set of femto access points 710 (e.g., the femto access points 710A and 710B that reside within a corresponding user residence 730). For example, when a subscriber is outside his home, he is served by a standard macro access point (e.g., access point 760) and when the subscriber is at home, he is served by a femto access point (e.g., access point 710A). Here, a femto access point 710 may be backward compatible with legacy access terminals 720.

A femto access point 710 may be deployed on a single frequency or, in the alternative, on multiple frequencies. Depending on the particular configuration, the single frequency or one or more of the multiple frequencies may overlap with one or more frequencies used by a macro access point (e.g., access point 760).

In some aspects, an access terminal 720 may be configured to connect to a preferred femto access point (e.g., the home femto access point of the access terminal 720) whenever such connectivity is possible. For example, whenever the access terminal 720A is within the user's residence 730, it may be desired that the access terminal 720A communicate only with the home femto access point 710A or 710B.

In some aspects, if the access terminal 720 operates within the macro cellular network 750 but is not residing on its most preferred network (e.g., as defined in a preferred roaming list), the access terminal 720 may continue to search for the most preferred network (e.g., the preferred femto access point 710) using a better system reselection (BSR) procedure, which may involve a periodic scanning of available systems to determine whether better systems are currently available and subsequently acquire such preferred systems. The access terminal 720 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 710, the access terminal 720 selects the femto access point 710 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 710 that reside within the corresponding user residence 730). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the above discussion described certain functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 9:
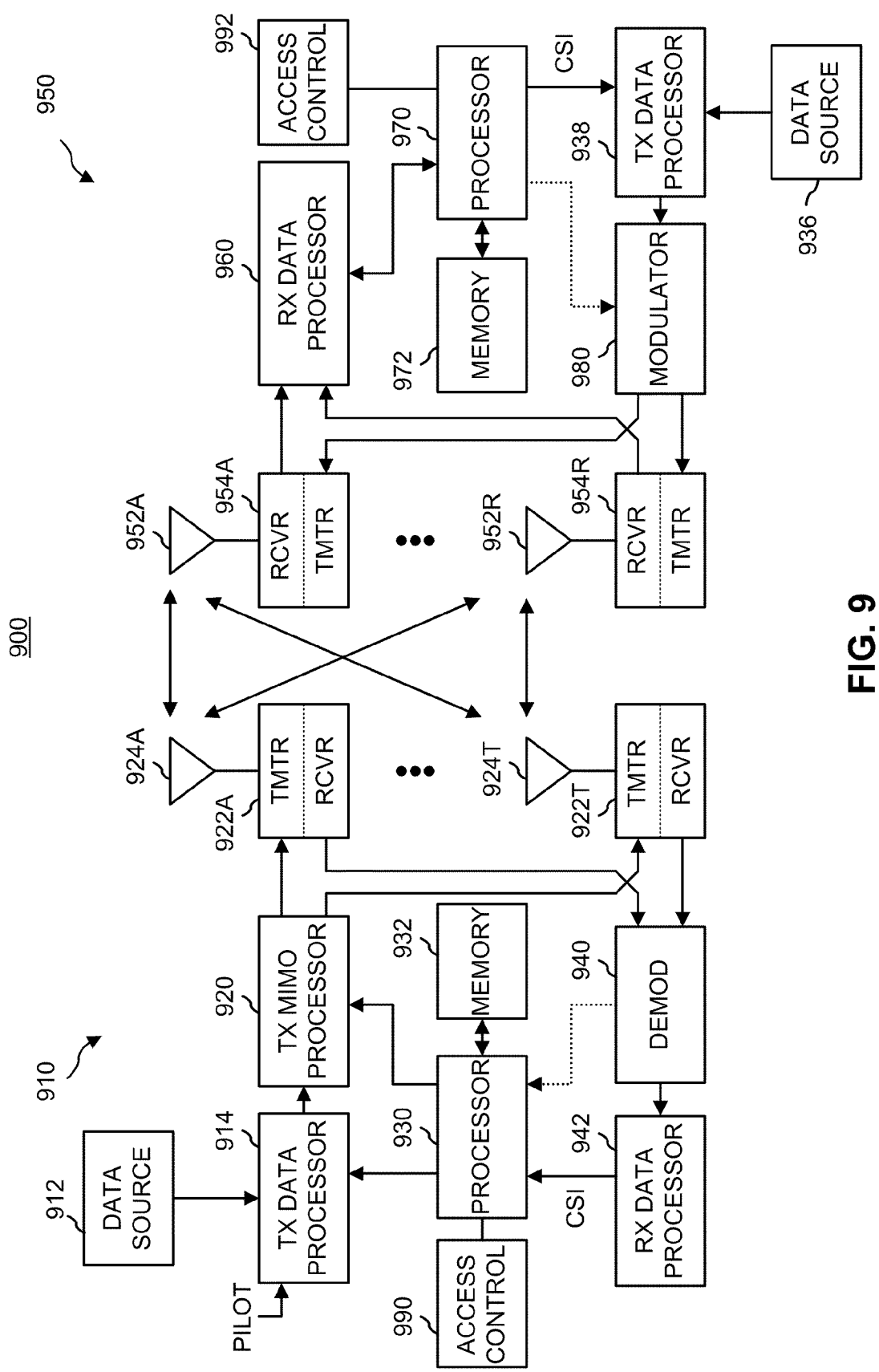
FIG. 9 is a simplified block diagram of several sample aspects of communication components.
Figure 10:
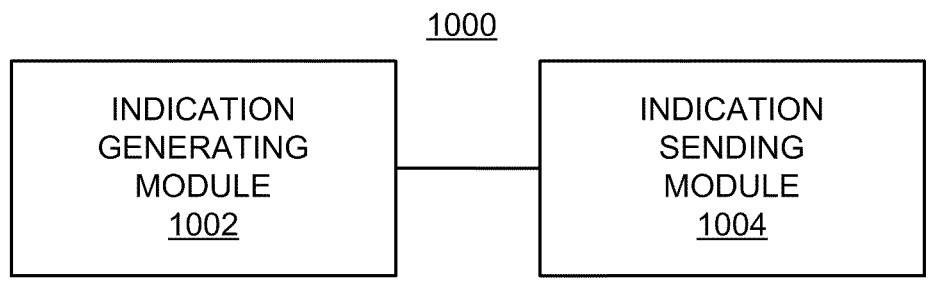
FIGS. 10-13 are simplified block diagrams of several sample aspects of apparatuses configured to provide access control as taught herein.
Figure 11:
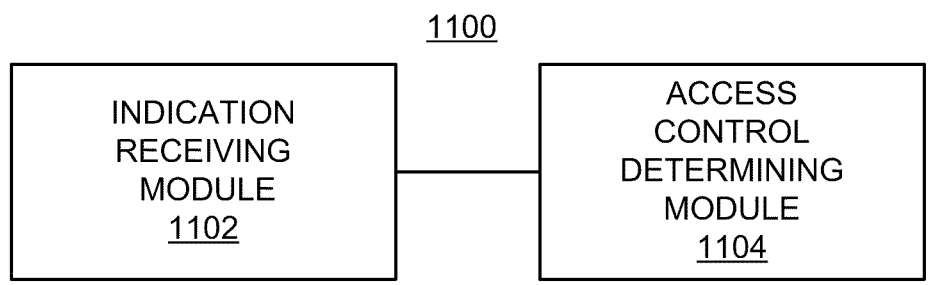
Figure 12:
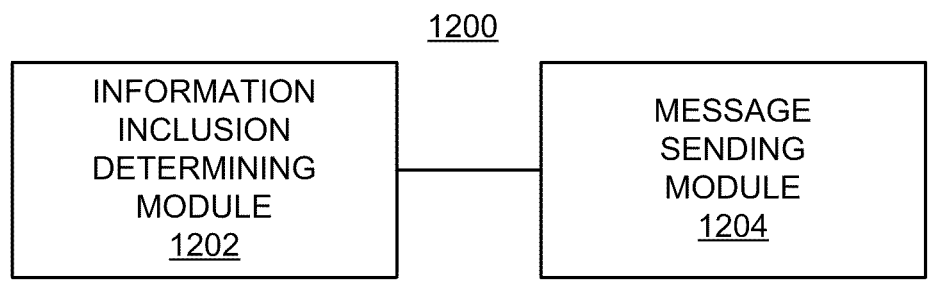
Figure 13:
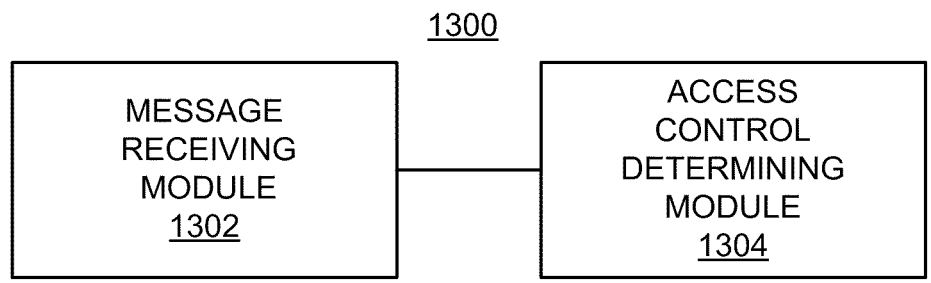

FIG. 9 illustrates a wireless device 910 (e.g., an access point) and a wireless device 950 (e.g., an access terminal) of a sample MIMO system 900. At the device 910, traffic data for a number of data streams is provided from a data source 912 to a transmit (TX) data processor 914. Each data stream may then be transmitted over a respective transmit antenna.

The TX data processor 914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides $N_T$ modulation symbol streams to $N_T$ transceivers (XCVR) 922A through 922T. In some aspects, the TX MIMO processor 920 applies beam-forming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922A through 922T are then transmitted from $N_T$ antennas 924A through 924T, respectively.

At the device 950, the transmitted modulated signals are received by $N_R$ antennas 952A through 952R and the received signal from each antenna 952 is provided to a respective transceiver (XCVR) 954A through 954R. Each transceiver 954 conditions (e.g., filters, amplifies, and downconverts) a respective received signal, digitizes the conditioned signal to provide samples, and further processes the samples to provide a corresponding "received" symbol stream.

A receive (RX) data processor 960 then receives and processes the $N_R$ received symbol streams from $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator (DEMOD) 940, and processed by a RX data processor 942 to extract the reverse link message transmitted by the device 950. The processor 930 then determines which pre-coding matrix to use for determining the beam-forming weights then processes the extracted message.

FIG. 9 also illustrates that the communication components may include one or more components that perform access control operations as taught herein. For example, an access control component 990 may cooperate with the processor 930 and/or other components of the device 910 to send/receive signals to/from another device (e.g., device 950) in conjunction with access control operations as taught herein. Similarly, an access control component 992 may cooperate with the processor 970 and/or other components of the device 950 to send/receive signals to/from another device (e.g., device 910) in conjunction with access control operations as taught herein. It should be appreciated that for each device 910 and 950 the functionality of two or more of the described components may be provided by a single component. For example, a single processing component may provide the functionality of the access control component 990 and the processor 930 and a single processing component may provide the functionality of the access control component 992 and the processor 970.

The teachings herein may be incorporated into various types of communication systems and/or system components.

In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 10-13, apparatuses 1000, 1100, 1200, and 1300 are represented as a series of interrelated functional modules. Here, an indication generating module 1002 may correspond at least in some aspects to, for example, an access control controller as discussed herein. An indication sending module 1004 may correspond at least in some aspects to, for example, a communication controller as discussed herein. An indication receiving module 1102 may correspond at least in some aspects to, for example, a communication controller as discussed herein. An access control determining module 1104 may correspond at least in some aspects to, for example, an access controller as discussed herein. An information inclusion determining module 1202 may correspond at least in some aspects to, for example, an access control controller as discussed herein. A message sending module 1204 may correspond at least in some aspects to, for example, a communication controller as discussed herein. A message receiving module 1302 may correspond at least in some aspects to, for example, a communication controller as discussed herein. An access control determining module 1304 may correspond at least in some aspects to, for example, an access controller as discussed herein.

The functionality of the modules of FIGS. 10-13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 10-13 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
communicating with an access terminal by an access point configured to provide restricted access to certain services to a defined set of access terminals that support closed subscriber group (CSG) functionality;
receiving, from the access terminal, an indication that the access terminal supports CSG functionality;
identifying, from among multiple network entities and based on the indication from the access terminal, a network entity for performing access control for the access terminal, wherein the network entity is identified from a portion of the multiple network entities designated to perform access control for the defined set of access terminals, and wherein a remaining portion of the multiple network entities is designated to perform access control for access terminals that do not support CSG functionality; and
sending a message comprising an access control indication to one of the remaining portion of the multiple network entities that is configured to forward the message from the access point to the identified network entity, wherein the access control indication is set to one of perform access control or not perform access control that indicates to the identified network entity whether to perform access control for the access terminal.

2. The method of claim 1, wherein the access control indication is an information element in a message.

3. The method of claim 1, wherein the access control indication is of a Boolean type or enumerated type.

4. The method of claim 1, wherein the network entity comprises a home NodeB gateway, a home eNodeB gateway, a mobility management entity, a mobile switching center, or a serving GPRS support node.

5. The method of claim 4, wherein the gateway comprises a home NodeB gateway or a home eNodeB gateway.

6. The method of claim 1, wherein the access point generates the access control indication based on information received from the access terminal that is indicative of whether the access terminal supports closed subscriber groups.

7. The method of claim 1, wherein the access point comprises a home NodeB, a home eNodeB, a radio network controller, or a closed subscriber group cell.

8. The method of claim 1, wherein the access control indication is sent via a UE Register Request message.

9. The method of claim 1, wherein the access control indication is sent via an Initial UE message.

10. The method of claim 1, wherein the one of the remaining portion of the multiple network entities is an access point gateway.

11. An apparatus for communication, comprising:
a transceiver configured to communicate with an access terminal by an access point configured to have restricted access to certain services to a defined set of access terminals that support closed subscriber group (CSG) functionality, and receive, from the access terminal, an indication that the access terminal supports CSG functionality;
an access control controller, comprising a processor including a central processing unit, configured to identify, from among multiple network entities and based on the indication from the access terminal, a network entity for performing access control for the access terminal, wherein the network entity is identified from a portion of the multiple network entities designated to perform access control for the defined set of access terminals, and wherein a remaining portion of the multiple network entities is designated to perform access control for access terminals that do not support CSG functionality; and a communication controller configured to send a message comprising an access control indication to one of the remaining portion of the multiple network entities that is configured to forward the message from the access point to the identified network entity, wherein the access control indication is set to one of perform access control or not perform access control that indicates to the identified network entity whether to perform access control for the access terminal.

12. The apparatus of claim 11, wherein the access control controller is further configured to generate the access control indication based on information received from the access terminal that is indicative of whether the access terminal supports closed subscriber groups.

13. The apparatus of claim 11, wherein the communication controller is further configured to send the access control indication via a UE Register Request message.

14. The apparatus of claim 11, wherein the communication controller is further configured to send the access control indication via an Initial UE message.

15. An apparatus for communication, comprising:
means for communicating with an access terminal by an access point configured to provide restricted access to certain services to a defined set of access terminals that supports closed subscriber group (CSG) functionality;
wherein the means for communicating comprises means for receiving, from the access terminal, an indication that the access terminal supports CSG functionality;
means for identifying, from among multiple network entities and based on the indication from the access terminal, a network entity for performing access control for the access terminal, wherein the network entity is identified from a portion of the multiple network entities designated to perform access control for the defined set of access terminals, and wherein a remaining portion of the multiple network entities is designated to perform access control for access terminals that do not support CSG functionality; and
wherein the means for communicating comprises means for sending a message comprising an access control indication to one of the remaining portion of the multiple network entities that is configured to forward the message from the access point to the identified network entity, wherein the access control indication is set to one of perform access control or not perform access control that indicates to the identified network entity whether to perform access control for the access terminal.

16. The apparatus of claim 15, wherein the means for identifying is further for generating the access control indication based on information received from the access terminal that is indicative of whether the access terminal supports closed subscriber groups.

17. The apparatus of claim 15, wherein the means for sending the access control indication is further for sending the access control indication via a UE Register Request message.

18. The apparatus of claim 15, wherein the means for sending the access control indication comprises means for sending via an Initial UE message.

19. A non-transitory computer-readable medium comprising code for causing a computer to:
communicate with an access terminal by an access point configured to provide restricted access to certain services to a defined set of access terminals that support closed subscriber group (CSG) functionality;
receive, from the access terminal, an indication that the access terminal supports CSG functionality;
identify, from among multiple network entities and based on the indication from the access terminal from, a network entity for performing access control for the access terminal, wherein the network entity is identified from a portion of the multiple network entities designated to perform access control for the defined set of access terminals, and wherein a remaining portion of the multiple network entities is designated to perform access control for access terminals that do not support CSG functionality; and
send a message comprising an access control indication to one of the remaining portion of the multiple network entities that is configured to forward the message from the access point to the identified network entity, wherein the access control indication is set to one of perform access control or not perform access control that indicates to the identified network entity whether to perform access control for the access terminal.

20. The non-transitory computer-readable medium of claim 19, further comprising code for causing the computer to generate the access control indication based on information received from the access terminal that is indicative of whether the access terminal supports closed subscriber groups.

21. The non-transitory computer-readable medium of claim 19, wherein the access control indication is sent via a UE Register Request message.

22. The non-transitory computer-readable medium of claim 19, wherein at least one of the access control indication is sent via an Initial UE message.

23. A method of communication, comprising:
receiving, at a network entity, a message comprising an access control indication from an access point configured to provide restricted access to certain services to a defined set of access terminals that support closed subscriber group (CSG) functionality,
wherein the access control indication is set to one of perform access control or not perform access control that indicates to the network entity whether to perform access control for an access terminal,
wherein the network entity is identified from a portion of multiple network entities designated to perform access control for the defined set of access terminals,
wherein a remaining portion of the multiple network entities is designated to perform access control for access terminals that do not support CSG functionality,
wherein the network entity receives the message from one of the remaining portion of the multiple network entities that is configured to forward the message from the access point to the network entity; and
determining, at the network entity, whether to perform access control for the access terminal based on the received access control indication.

24. The method of claim 23, wherein the determination of whether to perform the access control comprises performing the access control if the access control indication indicates that the network entity is to perform the access control or not performing the access control if the access control indication indicates that the network entity is not to perform the access control.

25. The method of claim 24, wherein the access control indication is an information element in a message.

26. The method of claim 24, wherein the access control indication is of a Boolean type or enumerated type.

27. The method of claim 23, wherein the network entity comprises a home NodeB gateway, a home eNodeB gateway, a mobility management entity, a mobile switching center, or a serving GPRS support node.

28. The method of claim 23, wherein the access point comprises a home NodeB, a home eNodeB, a radio network controller, or a closed subscriber group cell.

29. The method of claim 23, wherein the access control indication is received via a UE Register Request message.

30. The method of claim 23, wherein the access control indication is sent via an Initial UE message.

31. The method of claim 23, wherein the one of the remaining portion of the multiple network entities is an access point gateway.

32. The method of claim 31, wherein the access point gateway comprises a home NodeB gateway or a home eNodeB gateway.

33. An apparatus for communication, comprising:
a communication controller, comprising a processor including a central processing unit, configured to receive, at a network entity, a message comprising an access control indication from an access point configured to provide restricted access to certain services to a defined set of access terminals that support closed subscriber group (CSG) functionality,
wherein the access control indication is set to one of perform access control or not perform access control that indicates to the network entity whether to perform access control for an access terminal,
wherein the network entity is identified from among a portion of multiple network entities designated to perform access control for the defined set of access terminals,
wherein a remaining portion of the multiple network entities is designated to perform access control for access terminals that do not support CSG functionality,
wherein the network entity receives the message from one of the remaining portion of the multiple network entities that is configured to forward the message from the access point to the network entity; and
an access controller configured to determine whether to perform access control for the access terminal based on the received access control indication.

34. The apparatus of claim 33, wherein the determination of whether to perform the access control comprises performing the access control if the access control indication indicates that the network entity is to perform the access control or not performing the access control if the access control indication indicates that the network entity is not to perform the access control.

35. The apparatus of claim 33, wherein the network entity comprises a home NodeB gateway, a home eNodeB gateway, a mobility management entity, a mobile switching center, or a serving GPRS support node.

36. The apparatus of claim 33, wherein access control indication is received via a UE Register Request message.

37. The apparatus of claim 33, wherein the access control indication is received via an Initial UE message.

38. An apparatus for communication, comprising:
means for receiving, at a network entity, a message comprising an access control indication from an access point configured to provide restricted access to certain services to a defined set of access terminals that support closed subscriber group (CSG) functionality,
wherein the access control indication is set to one of perform access control or not perform access control that indicates to the network entity whether to perform access control for an access terminal,
wherein the network entity is identified from among a portion of multiple network entities designated to perform access control for the defined set of access terminals,
wherein a remaining portion of the multiple network entities is designated to perform access control for access terminals that do not support CSG functionality,
wherein the network entity receives the message from one of the remaining portion of the multiple network entities that is configured to forward the message from the access point to the network entity; and
means for determining, at the network entity, whether to perform access control for the access terminal based on the received access control indication.

39. The apparatus of claim 38, wherein the determination of whether to perform the access control comprises performing the access control if the access control indication indicates that the network entity is to perform the access control or not performing the access control if the access control indication indicates that the network entity is not to perform the access control.

40. The apparatus of claim 38, wherein the network entity comprises a home NodeB gateway, a home eNodeB gateway, a mobility management entity, a mobile switching center, or a serving GPRS support node.

41. The apparatus of claim 38, wherein the access control indication is received via a UE Register Request message.

42. The apparatus of claim 38, wherein the access control indication is received via an Initial UE message.

43. A non-transitory computer-readable medium comprising code for causing a computer to:
receive, at a network entity, a message comprising an access control indication from an access point configured to provide restricted access to certain services to a defined set of access terminals that support closed subscriber group (CSG) functionality,
wherein the access control indication is set to one of perform access control or not perform access control that indicates to the network entity whether to perform access control for an access terminal,
wherein the network entity is identified from among a portion of multiple network entities designated to perform access control for the defined set of access terminals,
wherein a remaining portion of the multiple network entities is designated to perform access control for access terminals that do not support CSG functionality,
wherein the network entity receives the message from one of the remaining portion of the multiple network entities that is configured to forward the message from the access point to the network entity; and
determine, at the network entity, whether to perform access control for the access terminal based on the received access control indication.

44. The non-transitory computer-readable medium of claim 43, wherein the determination of whether to perform the access control comprises performing the access control if the access control indication indicates that the network entity is to perform the access control or not performing the access control if the access control indication indicates that the network entity is not to perform the access control.

45. The non-transitory computer-readable medium of claim 43, wherein the network entity comprises a home NodeB gateway, a home eNodeB gateway, a mobility management entity, a mobile switching center, or a serving GPRS support node.

46. The non-transitory computer-readable medium of claim 43, wherein the access control indication is received via a UE Register Request message.

47. The apparatus of claim 43, wherein the access control indication is received via an Initial UE message.

* * * * *